United States Patent
Perritt, Jr.

(10) Patent No.: US 12,250,377 B1
(45) Date of Patent: Mar. 11, 2025

(54) SYSTEM AND METHOD FOR NEWSGATHERING WITH AN AUTONOMOUS AERIAL VEHICLE

(71) Applicant: Henry Hardy Perritt, Jr., Charlottesville, VA (US)

(72) Inventor: Henry Hardy Perritt, Jr., Charlottesville, VA (US)

(*) Notice: Subject to any disclaimer, the term of this patent is extended or adjusted under 35 U.S.C. 154(b) by 0 days.

(21) Appl. No.: 18/914,217

(22) Filed: Oct. 13, 2024

(51) Int. Cl.
| | |
|---|---|
| H04N 19/12 | (2014.01) |
| B64U 10/14 | (2023.01) |
| B64U 20/87 | (2023.01) |
| B64U 50/39 | (2023.01) |
| B64U 101/30 | (2023.01) |

(52) U.S. Cl.
CPC .......... H04N 19/12 (2014.11); B64U 10/14 (2023.01); B64U 20/87 (2023.01); B64U 50/39 (2023.01); *B64U 2101/30* (2023.01); *B64U 2201/104* (2023.01); *B64U 2201/202* (2023.01)

(58) Field of Classification Search
CPC ... H04L 1/0009; H04L 1/0014; H04L 1/0057; H04L 65/80; H04L 65/612; H04L 65/752; H04L 67/01; H04L 65/1045; H04L 65/756
USPC ......................................................... 375/240
See application file for complete search history.

(56) References Cited

U.S. PATENT DOCUMENTS

| | | |
|---|---|---|
| 7,218,610 B2 | 5/2007 | Sivakumar et al. |
| 8,171,154 B2 | 5/2012 | Vonog et al. |
| 8,234,398 B2 | 7/2012 | Vonog et al. |
| 8,332,736 B2 | 12/2012 | Mohan |
| 8,527,654 B2 | 9/2013 | Vonog et al. |
| 8,767,840 B2 | 7/2014 | Chuang |
| 9,258,333 B2 | 2/2016 | Bichot et al. |

(Continued)

FOREIGN PATENT DOCUMENTS

| | | | |
|---|---|---|---|
| CA | 3144363 A1 * | 12/2020 | ............. G06F 1/163 |
| EP | 2 150 022 | 2/2010 | |
| WO | 2020/048617 A1 | 3/2020 | |

OTHER PUBLICATIONS

Dejero, Dejero Smart Blending Technology, https://www.dejero.com/technology/smart-blending-technology (2020).

(Continued)

*Primary Examiner* — Masum Billah

(57) ABSTRACT

An autonomous aerial vehicle equipped to capture high quality video of news is integrated with bonded cellular and blended wireless capabilities and with automated battery replacement stations. This system, and the method for using it, enable individual journalists to transport the autonomous aerial vehicle to the site of breaking news or another newsworthy scene, launch the vehicle in a matter of minutes, and begin capturing video which is streamed through the wireless parts of the system to traditional broadcast channels, such as over-the-air television or to Internet-based streaming channels. The system and method aggregate the bandwidth of multiple cellular, microwave, and satellite channels to accommodate the bitrate of the video signal from the aerial camera. Automated battery replacement stations enable the autonomous aerial vehicles at least one autonomous aerial vehicle to remain in the air at all times, thus avoiding interruptions necessitated by battery exhaustion in the vehicles.

12 Claims, 15 Drawing Sheets

(56) References Cited

U.S. PATENT DOCUMENTS

| | | |
|---|---|---|
| 9,363,574 B1 | 6/2016 | Outellet |
| 9,446,858 B2 | 9/2016 | Hess |
| 9,510,236 B2 | 11/2016 | Freeman |
| 9,723,046 B2 | 8/2017 | Appleby et al. |
| 10,547,656 B2 | 1/2020 | Frusina |
| 10,555,027 B2 | 2/2020 | Karlsson et al. |
| 2012/0072933 A1 | 3/2012 | Moore |
| 2014/0164484 A1 | 6/2014 | Vonog et al. |
| 2016/0014176 A1* | 1/2016 | Ariav .................. H04L 67/52 |
| | | 709/219 |
| 2016/0043817 A1* | 2/2016 | Handoush ............ H04H 20/61 |
| | | 455/456.3 |
| 2020/0084254 A1 | 3/2020 | Boggia et al. |

OTHER PUBLICATIONS

Nguyen, Dieu Thanh et al, Error Concealment in the Network Abstraction Layer for the Scalability Extension of H.264/AVC, IEEE, 1-4244-0569-6/06 (2006).

\* cited by examiner

SYSTEM AND METHOD FOR NEWSGATHERING WITH AN AUTONOMOUS AERIAL VEHICLE

CROSS-REFERENCE TO RELATED APPLICATIONS

Not applicable

STATEMENT REGARDING FEDERALLY SPONSORED RESEARCH OR DEVELOPMENT

Not applicable

NAMES OF THE PARTIES TO A JOINT RESEARCH AGREEMENT

Not applicable

INCORPORATION BY REFERENCE STATEMENT

Not applicable

STATEMENT REGARDING PRIOR DISCLOSURES BY THE INVENTOR OR A JOINT INVENTOR

Not applicable

BACKGROUND

News is more complete and interesting when it includes visual imagery captured from above the scene. Television stations and other journalism organizations have used helicopters for decades to capture video imagery of newsworthy events, but helicopters are expensive and unavailable in smaller markets. Use of helicopters to gather news also requires significant preplanning as to when the helicopter crews will be available and when and where the helicopter will fly.

Small civilian drones (autonomous aerial vehicles or "AAVs") at prices of a few thousand dollars or less provide an attractive alternative for journalists who want to collect newsworthy imagery, including freelance journalists not attached to a traditional television station, newspaper, magazine, or wire service. These autonomous aerial vehicles, as they are more formally called, are flexible in their flight operations: they can move in and out on a target quickly, take up different angles for varying shots, and come with a variety of built in autonomous maneuvers such as target tracking and following. They have onboard cameras with resolution rivaling that of news-helicopter cameras. The cameras are mounted on three-axis gimbals that permit rotation of 360 degrees around yaw, pitch, and roll axes. These camera-gimbal combinations are increasingly capable of flexible use involving such functions as panning and optical and digital zooming.

Drones are a geographically convenient way to cover breaking news. The size and weight of commercially available off-the-shelf drones is such that they easily can be carried in a reporter's or photojournalist's backpack to the scene of breaking news or other places for background shots and launched and begin capturing video in less than five minutes. Drones can fly over crowded events or disaster zones, providing firsthand footage that would otherwise be difficult or dangerous for helicopters to obtain.

But drones suffer from a number of shortcomings that deter news outlets from using them. They lack the capability of sending high definition video over digital communications channels. The quality of the video imagery captured by a drone's camera is much better than can be received at the TV studio and broadcast over the air or through the Internet. Systems and methods for streaming high quality video from the AAV as it is captured and delivering that video to broadcast channels are underdeveloped.

Wireless transmission of the captured video data presents several challenges, however. The limited bandwidth and potential interference in a typical news reporting environment may result in packet loss or delays during live broadcasts. Additionally, maintaining consistent signal strength can be affected by factors such as obstacles (buildings, trees) and atmospheric conditions.

Bonded cellular networks aggregate multiple cellular connections (from different providers or the same provider) to create a more robust and reliable data link. A related technique, blended networks, aggregate multiple types of connections, such as satellite, and microwave, as well as cellular.

But flow control over multiple cellular networks and multiple types of networks, each of which may have different bandwidths, latencies, and levels of congestion, is challenging. A flow control mechanism must account for these varying characteristics and adjust the data transmission rate accordingly, preventing buffer overflows at the receiver end or underutilization of available bandwidth.

The bandwidth required to stream high quality video in real time exceeds that available from single cell phone channels. The bitrate for a 4K H.264-compressed video stream is about 45 Mbits per second, and 25 Mbits per second for H.265 compression. Cellular connection speeds range from 2 Mbits per second for older technologies to 30 Mbits per second for cellular long-term-evolution (LTE) and 200 Mbits per second for 5G, with an overall average of 25 Mbits per second. Emergencies and mass events such as concerts and athletic contests cause congestion on cellphone channels. A transponder for a C-band satellite in geosynchronous orbit has a bandwidth of up to 100 Mbits per second. Low-earth-orbit (LEO) satellite services offer uplink bandwidths of up to 25 Mbits per second Terrestrial microwave links offer bandwidths ranging from several hundred Mbits per second to several Gbits per second.

Latency varies, as well. Cellular connections suffer latencies from 40 to 100 ms. Microwave signals travel between transmitter and receiver at the speed of light. So latency is 5.38 microseconds per mile, or about 51 microseconds for a 10-mile link. LEO satellites offer latency less than 60 ms, compared to 555 ms latency on conventional Geo-Stationary-Orbit ("GSO") C-band satellites.

Digital audio and video data almost always are handled in the form of packets defined chunks or clusters of information that can be processed separately from each other by computers, their memories and in communications channels. The Internet is a packet network, in which packets are defined by the familiar internet protocol (IP), TCP, and UDP protocols. A newer protocol, QUIC, defined in Internet RFC 9000, has become popular for digital video processing.

IP is unreliable. It is a best efforts protocol. A packet is presented by one router to the next without any knowledge about what happens to it after that. As a result, TCP (the transmission control protocol) sits on top of IP in most networks and adds features to assure reliability. It does that by withholding the next packet from transmission until an acknowledgment (ACK) or negative acknowledgment (NACK) has been received from the other end. If an ACK is received, TCP sends the next packet. If an NACK is received, it re-sends the previous packet. That is unsuitable for continuous information like audio or video. For those forms of information it is better to miss a few packets than to have delays interspersed by the ACK/NACK process. On the other hand, packets for these services must be assembled in order and synchronized with each other in terms of timing.

UDP (user datagram protocol) is an alternative to TCP. It does not wait for packets to be acknowledged before sending the next ones. It relies on packet numbers and clock signals to keep the packets in order. QUIC has the same features as UDP but it facilitates handling streams of audio and video data through multiple channels. QUIC does not provide any means of ensuring ordering between bytes on different streams. QUIC handles intra-stream ordering automatically, but ordering across different streams must be managed by the application. The system and method use sequence in the application-layer to achieve this.

Both TCP and UDP break the data down into small chunks and afterward reassemble the chunks into the original content on the opposite end to make sure that each message reaches its target location intact. Sending the information in little chunks of information makes it simpler to maintain efficiency as opposed to sending everything in one go.

Managing fragmentation in a blended network, where data is split across multiple layers (e.g., QUIC and IP) and transmitted over various link types (cellular, microwave, Wi-Fi, satellite), presents unique challenges, especially when fragmentation impacts sequencing. In such cases, the sequence number assigned by the application may be lost during fragmentation, leading to out-of-order or corrupted data delivery if not properly handled.

H.264 fragments a full video frame into macroblocks of 16×16 pixels. H.265 uses variable-size coding tree units ranging from 8×8 to 64×64 pixels. The macroblocks or coding tree units are grouped into slices. The slices then are fragmented by the Network Abstraction Layer to fit within the maximum transmission units (MTUs) of lower level layers such as UDP and IP. After a particular message is broken down into chunks, these chunks may travel in multiple channels if one channel is jammed but the destination remains the same.

Each layer of a communications network has a maximum transmission unit ("MTU"): the maximum size, in bytes, of chunks that layer can handle. Larger MTUs are more efficient, because the overhead associated with each chunk, such as the address of the sender and the target and its length, and redundancy check, need be sent less often. Larger MTUs results in more delay when chunks have to be resent because of errors in the network, however.

A variety of products and methods exist to bond multiple cellular connections into blended multiple cellular connections with other types of wireless connectivity, including microwave links, satellite links, Wi-Fi, and proprietary video channels, such as drone vendor DJI's.

Bonded cellular networks aggregate multiple cellular connections (from different providers or the same provider) to create a more robust and reliable data link. This technique, often referred to as "channel bonding" or "cellular bonding," is widely used in applications, such as live streaming, mobile broadcasting, and mission-critical communication where maintaining high bandwidth and low latency is crucial. Bonded cellular ensures that the user's data is distributed across multiple network connections, which helps maintain service even when some networks experience congestion or failure. Two key components of ensuring smooth communication over these bonded channels are flow control and sequencing.

Packet loss is an inevitable issue in cellular networks, especially in challenging environments with poor signal quality. In bonded cellular systems, sequencing mechanisms must be robust enough to handle packet loss. Requesting retransmission when a packet is lost, as in TCP, is unsuitable for full-motion video.

U.S. Pat. No. 9,363,574 (the '574 patent) addresses the problem of a plurality of clients able to receive video information at different rates. A client anticipating delay, because, for example, its input buffer is full, sends a message to the video source system, which causes the video source system to stop sending any video frames to that client until the client signifies that it is ready once again. This approach shuts down the client channel altogether rather than throttling it by reducing the bitrate.

Error concealment algorithms such as these, written for H.264 network abstraction layers, do not solve the problem of imperfect communication channels that repeatedly produce errors or drop network application layer NAL units. Indeed the problem may worsen if errors propagate in the error concealment system. A need exists for effective throttling of channels that cannot keep up with the other channels while retaining whatever bandwidth they offer.

Blended networks, which combine multiple types of communication links, such as cellular, microwave, Wi-Fi, and satellite, offer the potential for robust and high-performance data transmission by leveraging the strengths of each link. Coordinating these diverse technologies, however, presents significant challenges for flow control and sequencing due to the varying characteristics (e.g., latency, bandwidth, reliability) of each connection.

Each type of link in a blended network has unique properties: Cellular has variable bandwidth and latency depending on network congestion, signal strength, and cellular technology (e.g., 5G vs. LTE). Microwave has high bandwidth and low latency over short distances, but is subject to environmental factors like line-of-sight and weather. Wi-Fi has high bandwidth and short-range, stable environments but is prone to interference and performance degradation with distance or congestion. Broadband wireless connections have higher bandwidth than cellular, but are not available everywhere. Satellite has long latency (due to the distance to geostationary satellites) but is reliable, with the ability to cover remote areas where other technologies fail. Low Earth Orbit satellite systems, such as Starlink, have recently become available. They offer considerably lower latency.

Few rotary-wing drones have endurance greater than forty minutes, and most cannot fly for more than twenty or thirty minutes without needing fresh batteries. Few news assignments are that short. A fully functional and attractive system and method require solutions to the endurance problem.

In sum, newsgathering from the air is out of reach for many journalists because of the cost of helicopters and their unavailability in many geographic areas. When journalists use affordable consumer drones, the low bitrate of available wireless channels prevents broadcasting the high definition imagery available from the AAV cameras. Available cellular bonding and link blending solutions make it difficult to divide a high bitrate stream into separate lower bitrate streams while keeping the correct sequence of chunks of video information. The short endurance of consumer drones limits coverage.

News gatherers wishing to take advantage of this expanded connectivity options such as bonded cellular are put in the position of acquiring autonomous aerial vehicles and their systems and separately acquiring devices for achieving high bandwidth channels to stream the video from those vehicles. The news gatherers and their employment organization must undertake the non-trivial integration of the flight and video technology with the communications technology.

Definitions

"Autonomous" refers to the capability to perform a defined mission without receiving detailed commands from a human operator. It does not exclude human commands to begin and to terminate a mission or to command particular maneuvers with respect to a target.

"Bitrate" is the rate at which digital bits flow through a channel in a bitstream, typically measured in bits per second.

"Bitstream" is the flow of digital bits through a channel

"Broadband wireless connection" is a type of commercial wireless data communications service covering several miles and usually offering higher bandwidth than cellular.

For this application, the terms "connection," "link," and "channel," have the same meaning.

A channel's "capacity" is determined by its bitrate, latency, and error rate. Higher bitrates, lower latency, and lower error rate means higher capacity; lower bitrates, higher latency, and higher error rate means lower capacity.

A "chunk" is a set or cluster of bits or bytes. The term comprises a packet at the open systems interconnection (OSI) network layer, a sequence at the OSI transport layer, a unit in the network abstraction layer, and a frame at the application layer. "To chunk" is to divide a larger collection of bits or bytes, such as a stream, into a smaller set or cluster.

"Latency" refers to the time elapsed between when a chunk of data is placed into a stream and time at which it emerges at the other end.

"Maximum Transmission Unit" ("MTU") is the largest data chunk an Internet-connected device or a layer in the OSI stack can accept.

The "open systems interconnection" (OSI) is an abstract model of digital communications. The OSI stack comprises multiple layers that interoperate with each other, passing data back and forth between adjacent layers. The application layer is at the top; the physical network assets are at the bottom. In between are network layer protocols, such as the internet protocol (IP) and transport and session layer protocols, such as transmission control protocol (TCP) and user datagram protocol (UDP). H.264 is a popular application-layer protocol for full-motion video, H.264 is a video coding layer (VCL). H.264's network abstraction layer (NAL) formats VCL representation of video data and provides header information to facilitate handling by lower layers of the OSI stack. NAL organizes coded video data into NAL units, each with an integer number of bytes.

"Newsworthy event" means an occurrence or phenomenon that is, in the judgment of journalists, likely to be of interest to consumers of their journalism.

"Throttling" means reducing the flow of a bitstream.

"Wi-Fi" is a type of wireless data communication service, complying with the Institute of Electrical and Electronic Engineers (IEEE) 802.11x standard, covering up to hundreds of feet.

BRIEF SUMMARY

A system and method designed to capture and broadcast real-time video of newsworthy events comprises multiple components working together to ensure high-quality video transmission. At the core is an autonomous aerial vehicle (AAV) equipped with a digital camera, remotely controlled by a ground device. The system incorporates a radio transceiver on the AAV that both receives commands and transmits video imagery. The AAV connects to a ground-based dispatcher through wireless links. The dispatcher processes video data, dividing it into packets, assigning sequence numbers, and sending the packets over the most appropriate of a plurality of wireless links comprising cellular networks, satellite connections, microwave links, and other broadband wireless channels, depending on each channel's performance.

Key to the system's function is the AAV's ability to operate autonomously, while remaining under the ultimate control of a human operator. It is equipped with a 360° gimbal to stabilize the camera and to capture a full range of angles. A digital signal processor on the AAV compresses the captured video stream, adhering to industry standards, such as H.264 or H.265, reducing the data load for transmission without sacrificing quality. The AAV's remote control device allows the operator to manage both flight maneuvers and camera controls, while a radio transmitter onboard ensures the transmission of high-definition video. The remote control device has a plurality of controls allowing a human user to command aerial vehicle maneuvers and flight paths capable of launching the autonomous aerial vehicle and flying it to a position where it has a view of the newsworthy event. The remote control device and the AAV have interoperable computer software and hardware that use data from onboard sensors to carry out human commands autonomously, to maintain position and to adhere flight paths. The AAV is initially activated by a human user, typically a journalist, and commanded by that human user to fly to a position where it has a view of the newsworthy event. Thereafter, the AAV maintains its position and flight path and otherwise carries out human commands autonomously through its onboard sensors and navigation software.

The system's dispatcher manages the flow of data from the AAV. It chunks the video stream into smaller segments, ensuring that these packets are appropriately sized for transmission across the various wireless digital links, blended, to receive data from a single stream originating on the AAV. The dispatcher's task is to monitor network performance, assigning sequence numbers to each packet and transmitting them across the available channels. This ensures that the video data flows smoothly, even when network conditions are less than optimal.

At the receiving end, a gatherer collects the video packets transmitted over multiple wireless links. The gatherer's responsibility is to reassemble the packets in the correct order using the sequence numbers, effectively reconstructing the original high-definition video stream. The system handles varying latency and performance across channels, ensuring that even delayed packets arriving over slower links like satellite are correctly reordered to maintain video integrity.

The system and method are suitable for over-the air broadcasting, broadcasting through wired terrestrial networks, broadcasting through satellite services, and streaming through the Internet.

One of the system's strengths lies in its use of sequence numbers to manage data transmission over blended networks. Since different communication channels often exhibit different speeds and latency, packets may arrive out of order. The dispatcher's sequencing mechanism ensures that each packet is tagged with a unique sequence number, which the gatherer uses to reorder them. This process prevents corrupted data or jittery video playback, ensuring that the transmission remains smooth even when packets arrive out of sequence.

To handle varying transmission speeds, the system incorporates a robust flow control mechanism. This ensures that no single connection is overwhelmed by the data rate, preventing dropped packets and minimizing delays. The system balances the load across faster and slower links by adjusting transmission rates in real-time, based on feedback from the receiver. This adaptive flow control maintains synchronized data delivery, especially when different channels have significant differences in bandwidth and latency.

Buffering is another element of the system's design. Each channel in the blended network may have different latency characteristics, and buffering helps accommodate these differences. At the receiving end, buffers hold packets until all data arrives, ensuring the correct reassembly of the video stream. Larger buffers are used for high-latency links, such as satellite, while smaller buffers handle faster, more reliable connections. This adaptive buffering system ensures that no data is lost or processed out of order.

The system is also designed to handle packet loss effectively. If a chunk of data is lost in transmission, the gatherer sends feedback to the dispatcher in the form of the sequence numbers of the missing chunks, requesting that the missing chunks be resent or allowing the system to throttle the underperforming channel. Additionally, techniques such as forward error correction (FEC) can reconstruct lost packets without requiring retransmission, further enhancing the system's resilience against packet loss and ensuring smooth video delivery even in challenging environments.

In addition to managing the transmission of video data, the system addresses the AAV's limited flight endurance. An automatic battery replacement station allows the AAV to continue operations without interruption. When the AAV's battery is running low, it autonomously flies to the station, where a fresh battery is automatically exchanged. Meanwhile, a relief drone takes over video coverage, ensuring continuous footage of the news event.

The portability of the system makes it ideal for capturing news from remote or difficult-to-reach locations. The entire setup, including the AAV, control equipment, and battery replacement station, can be transported in a single suitcase, making it a highly practical solution for journalists on the move. The use of AAVs as an affordable alternative to news helicopters provides significant cost savings while enhancing the ability to gather aerial footage from virtually any location.

In summary, the system combines AAV technology with sophisticated wireless communication strategies to deliver high-quality video from airborne cameras to broadcast studios or internet servers. By chunking the video stream, managing data flow across blended wireless channels, and reassembling the data at the receiving end, the system ensures reliable, high-definition video transmission. Automatic battery replacement and portability further enhance its practicality, offering an innovative and cost-effective solution for modern newsgathering.

BRIEF DESCRIPTION OF THE SEVERAL VIEWS OF THE DRAWINGS

To identify the discussion of any particular element or act, the most significant digit or digits in a reference number refer to the figure number in which that element is first introduced.

DETAILED DESCRIPTION

Overview

Figure 1:
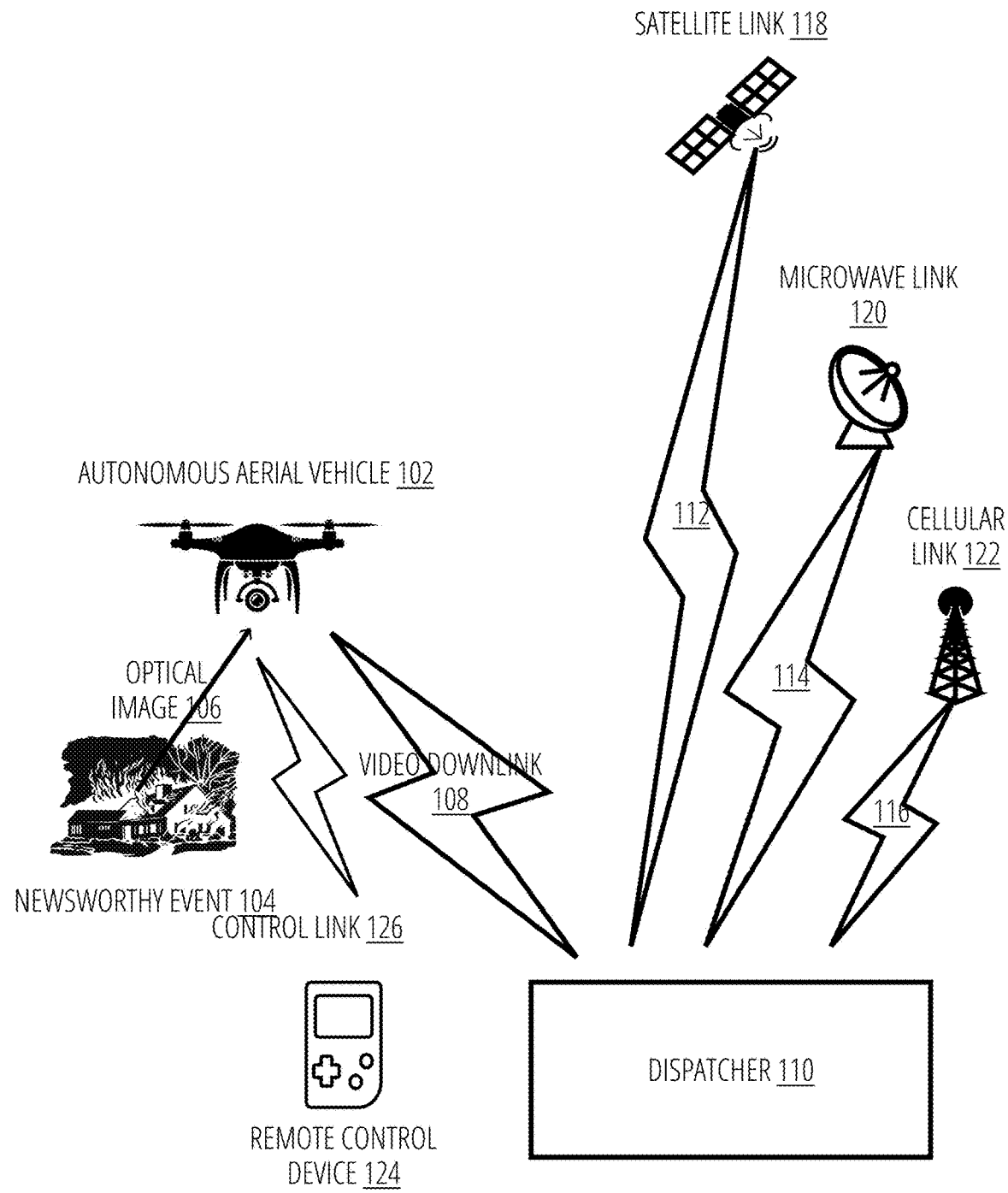
FIG. 1 provides an overview of the system, including the newsworthy event, the autonomous aerial vehicle, the video downlink to the dispatcher, the uplinks to a sample of the wireless channels, and their feeds to the gatherer which reassembles the original video images and passes them along to the broadcast transmitter or Internet server.
Figure 2:
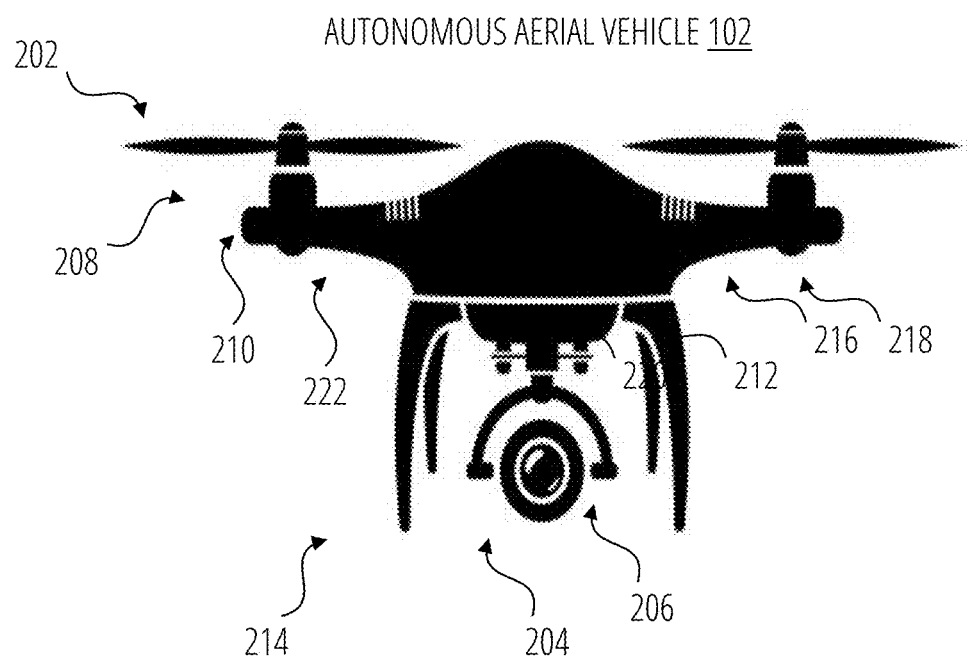
FIG. 2 shows the components of the autonomous aerial vehicle.
Figure 3:
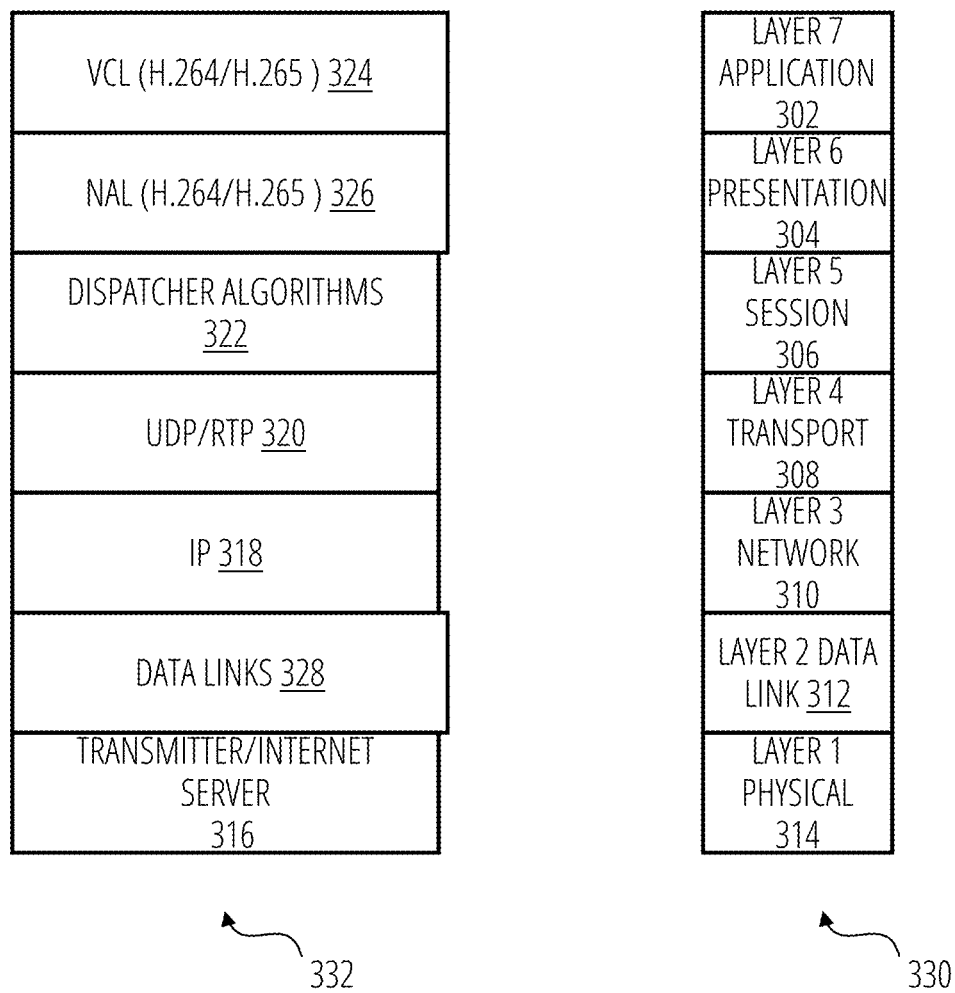
FIG. 3 presents a side-by-side comparison of the OSI stack and the steps in the system and method's digital signal processing.
Figure 4:
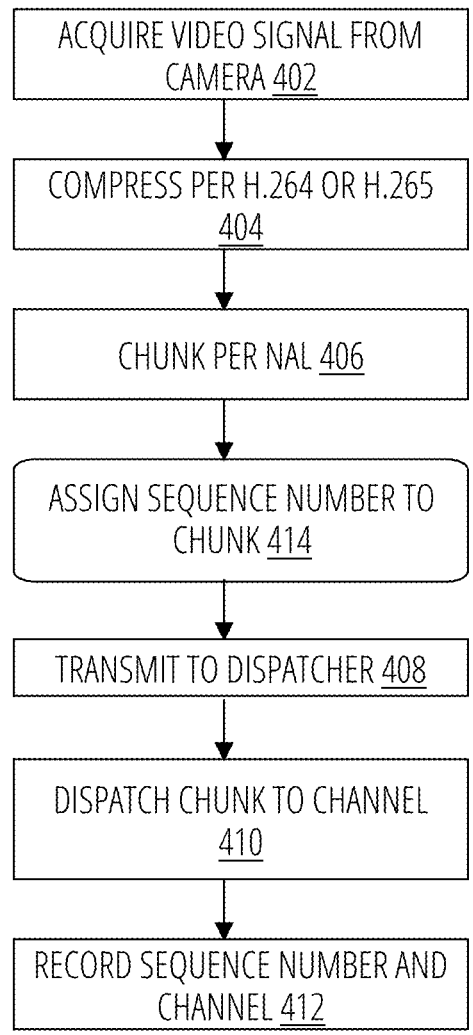
FIG. 4 is a flowchart showing how the dispatcher chunks the data stream from the camera downlink and assigns sequence numbers to the chunks.
Figure 5:
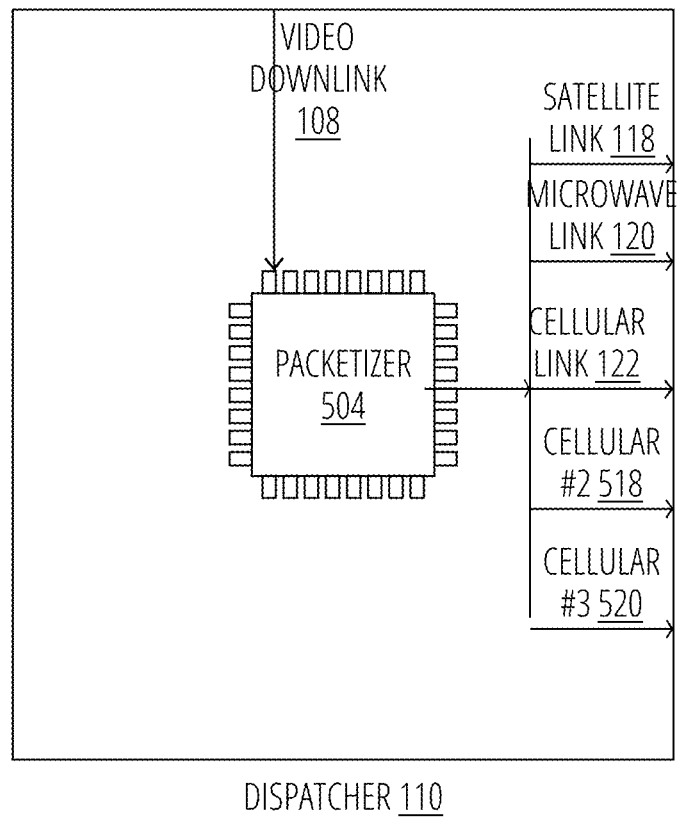
FIG. 5 depicts the dispatcher, showing the connections among its packetizer, the camera downlink, and the wireless uplink channels.
Figure 6:
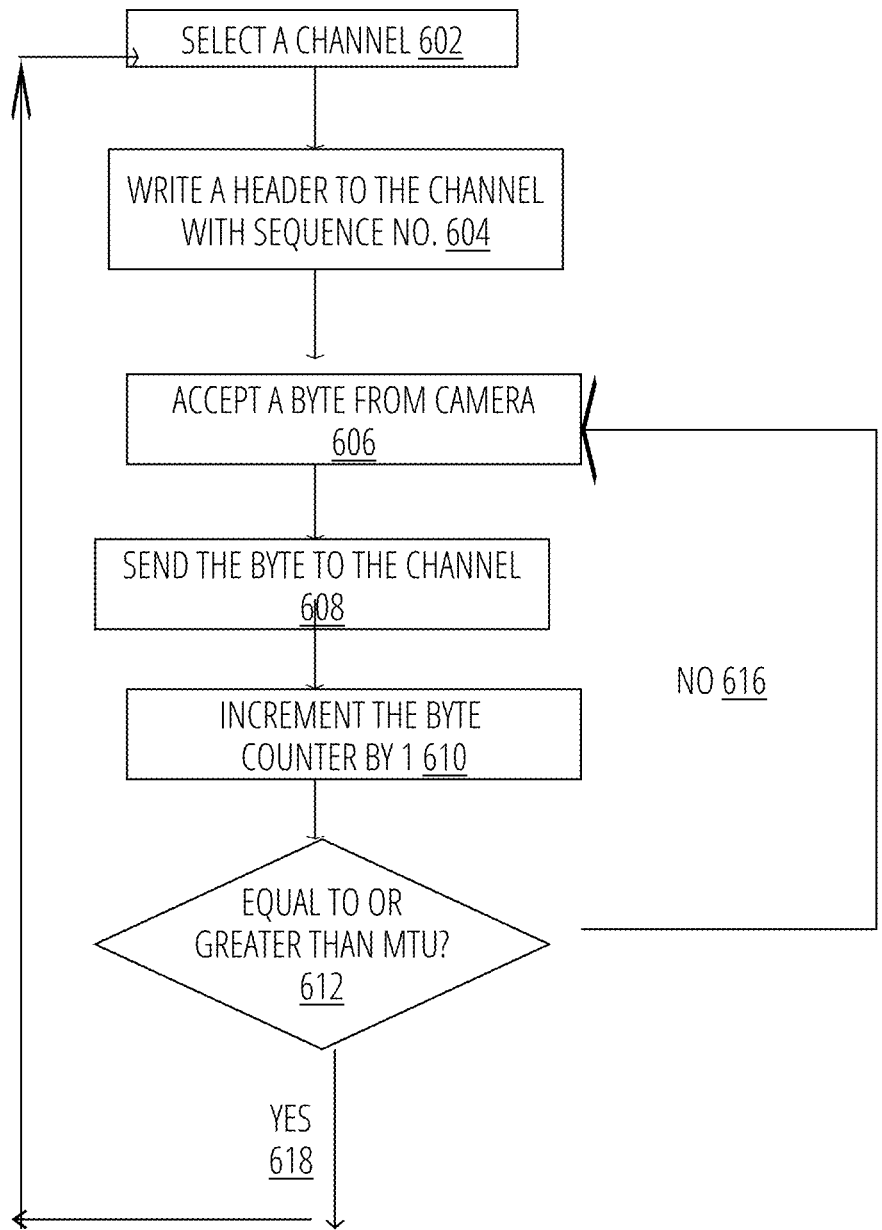
FIG. 6 is a flow chart depicting the chunking process in the dispatcher.
Figure 7:
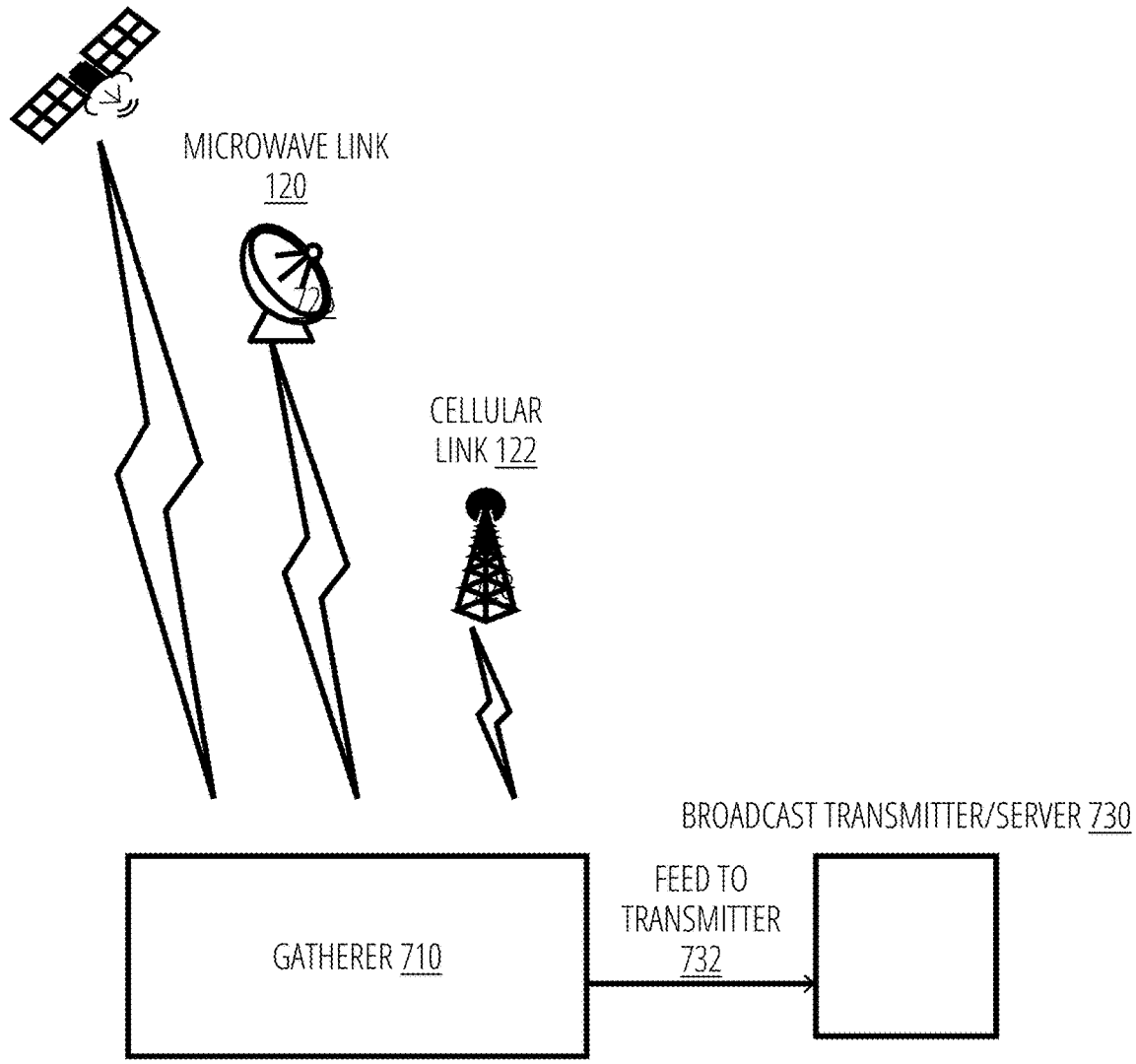
FIG. 7 depicts the gatherer and its relationship with the wireless channel downlinks and the broadcast transmitter or Internet server.
Figure 8:
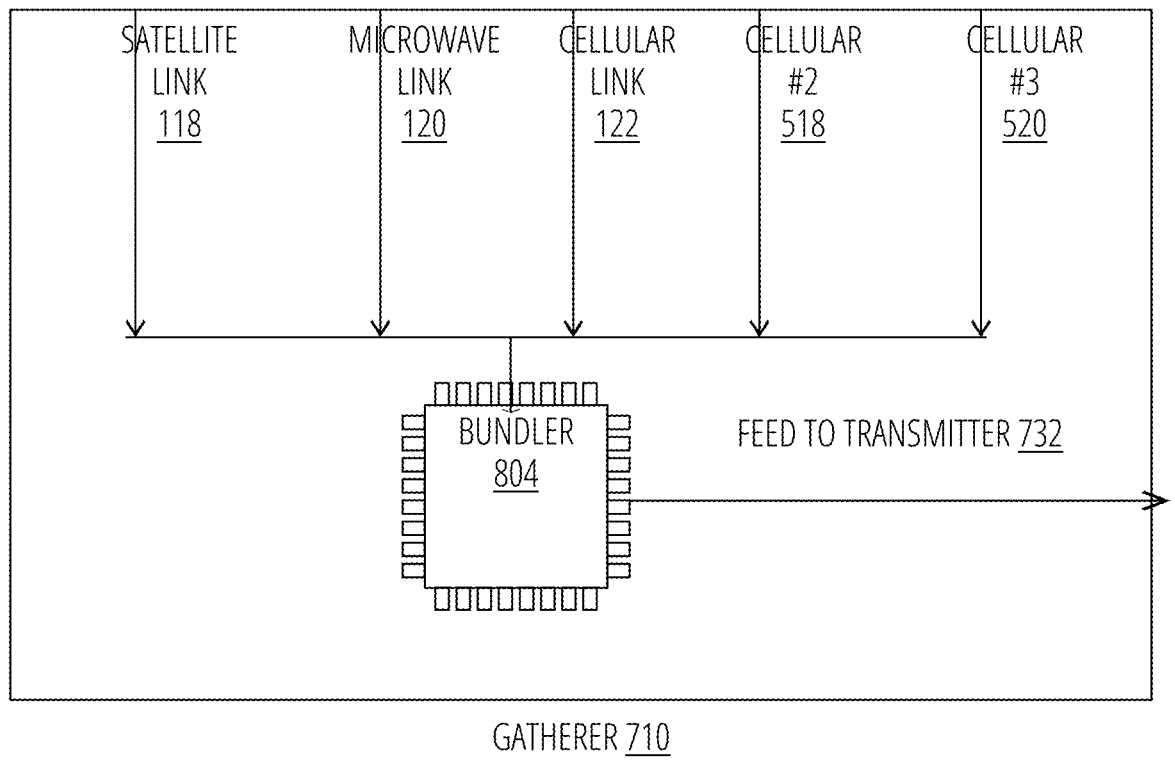
FIG. 8 shows the components of the gatherer, including its bundler and its connections to the wireless channel downlinks and the transmitter feed.
Figure 9:
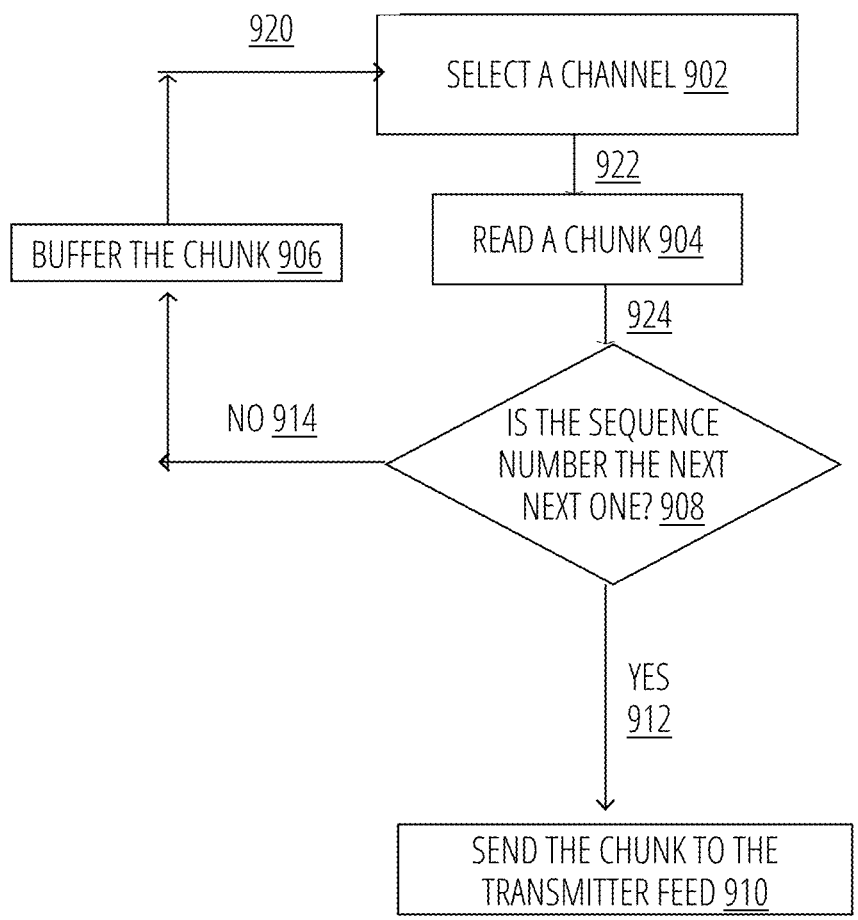
FIG. 9 is a flowchart showing how the bundler in the gatherer receives the chunks from the various wireless links and reassembles them in order.
Figure 10:
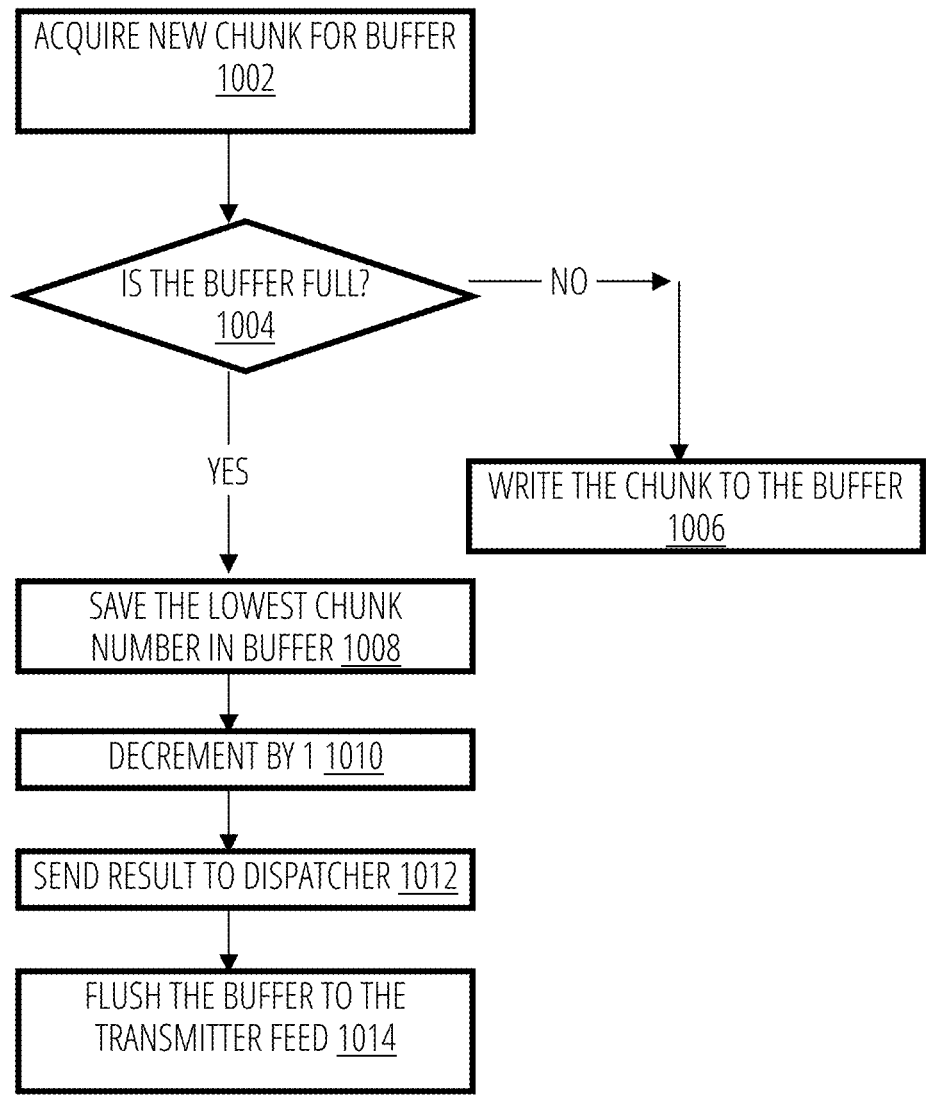
FIG. 10 is a flow chart depicting the logic in the gatherer that detects channel errors and reports them to the dispatcher.
Figure 11:
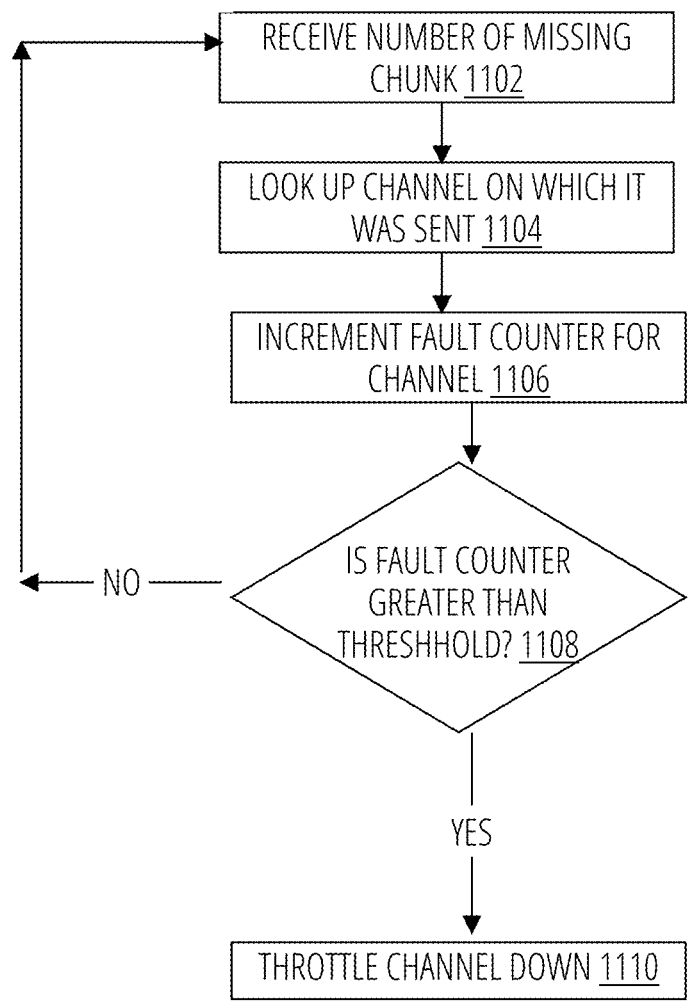
FIG. 11 is a flowchart depicting the logic in the dispatcher that adjusts the flow to different channels according to information received from the gatherer about channel performance.

The system supports a method of newsgathering from the air using an autonomous aerial vehicle and a plurality of digital wireless data channels that collectively handle the high bitrate of high-definition video captured by the camera. The imagery captured by the autonomous aerial vehicle is transmitted through these channels to a broadcast studio from which it is sent to an over-the air TV transmitter or Internet service. Some embodiments allow the autonomous aerial vehicle to stay aloft as long as news is developing, regardless of its designed endurance. The system and method are suitable for covering breaking news as well as background imagery. Newsbroadcasts, for example, frequently show images of a highway, a river, or an airport to accompany voice-over commentary.

The system and method may employ the widely used H.264 or H.265 video compression standard at the application layer 302 of the OSI stack 330. The algorithms associated with the standard compress the video bitstream captured by the camera. The standard's Network Application Layer (NAL) 326 chunks the resulting bitstream into units of a size appropriate for lower layers of the OSI stack.

The dispatcher passes these chunks to the UDP/RTP (real-time transport protocol) 320 and IP 318 layers, which attach additional sequencing and routing information and pass them down to the physical links: wireless transmitters and antennas or Internet server 316.

At the receiving end, IP packets 318 and UDP sequences 320 are passed up in the OSI stack 330 of the gatherer's decoder to the application layer 302. The system and method supplement H.264 or H.265 in the application layer by keeping track of NAL chunks that were never received by the gatherer 710 and periodically sends identifying numbers of those chunks back to the dispatcher 110.

The dispatcher 110 uses data in the form of sequence numbers of chunks lost in transmission between the dispatcher and the gatherer to throttle specific channels with the highest loss rates.

The system operates at two different, widely separated locations: a site where a newsworthy event is occurring, (the newsworthy event 104) such as an accident, demonstration, structure fire, or natural disaster, and the site of the studio, where programming is prepared for broadcast, either over the air or through the Internet. The autonomous aerial vehicle and a reporter are located at the newsworthy event 104 site, along with antennas for each of the communications channels. At or near the studio, a gatherer 710 receives signals from the communications channels and processes them for a feed to the studio and the transmitter or server, replicating the imagery captured by the autonomous aerial vehicle's 102 camera.

Flight Vehicle, Camera, and Gimbal

One embodiment of the autonomous aerial vehicle is a small rotorcopter, typically a quadcopter, capable of flying at a maximum speed of about 50 knots, over a range of 20 nautical miles, with a maximum endurance of about 40 minutes. The vehicle has four rotors 202, powered by brushless dc (direct current) motors 208, associated dc brushless motor controllers 210, and an onboard lithium-ion battery 220, easily removable for replacement and recharging.

The vehicle has a navigation and control module 212 configured to execute algorithms modeling vehicle dynamics, to determine vehicle position and orientation, and to process sensor data. The navigation and control module 212 contains computer program code that generates specific rotor RPM (revolutions per minute) and pitch adjustments speed, steering, and rotor pitch adjustments to position the AAV on a flight path based on the AAV's current flight path, environmental conditions and program commands.

The vehicle comes equipped with sensors and a guidance-and-control module that work together to maintain drone stability; to execute maneuvers, such as climbs, turns, and descents; and to keep it on an intended flight path with respect to defined locations.

The sensors comprise one or more cameras 204, one or more lidar sensors, a barometric altimeter, an inertial measurement unit ("IMU"), and a GPS (global positioning system) receiver.

The camera 204 is mounted on a three axis 360° gimbal 206 with small servomotors on each axis capable of rotating the gimbal and the mounted camera through 360° around any axis. The gimbal is controllable by commands sent from the ground or generated by an onboard computer program in the navigation and control module 212, for example to identify and follow a target. The onboard digital camera 204 has lenses and a sensor suitable for at least 4K quality video at 60 frames per minute. Such little digital cameras are widely available in the market at low cost and typically come installed on commercially available off-the-shelf drones.

The gimbal 206 receives detailed commands for its servomotors from algorithms on the navigation and control module that handle commands from the remote control device 124 or the dispatcher 110.

A digital signal processor 222 compresses the video stream from the camera—a digital bitstream representing the images captures by the camera—according to a standard, such as H.264 or H.265 404, and chunks it in the network abstraction layer ("NAL") 326.

The navigation and control module 212 combines the GPS data with IMU data to provide real-time updates of the autonomous aerial vehicle's location and altitude, with data refreshed several times per second.

Together the sensors and the navigation and control module 212 are capable of determining the AAV's latitude, longitude, and altitude and updating those data periodically—several times a second. The guidance-and-control module processes sensor data to determine the vehicle's latitude, longitude, and altitude, and updates said data periodically; and also receives commands from the remote control device and execute flight paths based on said commands. It uses a set of algorithms modeling vehicle dynamics to process data from the sensor module to determine vehicle position orientation and movements in space.

The autonomous aerial vehicle 102 comprises a video downlink transmitter 216 and antennas 214 to transmit high-definition video through a dedicated high-bandwidth unidirectional video channel to a remote control device and to a dispatcher.

The autonomous aerial vehicle 102 comprises a telemetry and command transceiver 218 and antennas 214 capable transmitting telemetry and receiving commands from the remote control device 124.

The autonomous aerial vehicle 102 accepts commands from the remote control module and uses those as inputs to its computer application code and navigation and control module to map flight paths, such as a return to home, flight to and hover over a target, and follow a moving target. The guidance-and-control module also translates high-level maneuver commands originating with the human user and the onboard program code into detailed yaw, pitch, roll, and thrust commands for the motors spinning the rotors.

The autonomous aerial vehicle 102 is accompanied by a remote control device 124 connected to the autonomous aerial vehicle 102 by a control link 126. The remote control device 124 accepts user input in the form of high-level flight- and camera-control commands and translates these high-level flight commands into yaw, pitch, roll, and thrust commands for the AAV's motors. The remote control device 124 contains computer program code that generates specific rotor RPM (revolutions per minute) and pitch adjustments speed, steering, and rotor pitch adjustments to position the autonomous aerial vehicle 102 on a flight path based on its current flight path, environmental conditions and user flight commands.

The remote control device 124 comprises computer program code capable of processing human inputs and combining them with predefined maneuver profiles to arrive at commands to be sent over a wireless channel to the vehicle. The remote control device computer code includes procedures that adjust images captured by the camera and transmitted wirelessly back to the remote control device and for brightness and contrast.

The interface between the remote control device 124 and the navigation and control module 212 transform user input and high-level maneuver commands into yaw, pitch, roll, and thrust commands for the AAV's motors through computer program code that generates specific rotor RPM (revolutions per minute) and pitch adjustments speed, steering, and rotor pitch adjustments to position the AAV on a flight path based on the AAV's current flight path, and environmental conditions.

In some embodiments, the camera is controlled mostly from the dispatcher 110; in other embodiments the camera is controlled through the remote control device 124. In either event gimbal control commands represent a combination of intelligence embedded in the algorithms and human commands. Gimbal control commands determine vertical and horizontal angle between the camera axis and the vehicle axis and the camera field of view, from wide-angle to telescopic.

The vehicle and the remote-control device have two separate radio channels between them: a bidirectional control link 126, through which commands are sent to the vehicle and telemetry about vehicle position and behavior sent back to the remote control device, and a unidirectional high-bandwidth video downlink 108. Signals on the video downlink channel are duplicated between the remote-control device, enabling the user to see what imagery is being captured, and the dispatcher for processing and transmission to the broadcast transmitter or server.

Video Processing and Uplink Channels

A plurality of communications channels 112, 114, and 116 connect the components of the system to each other and to a broadcast studio and its associated transmitter or Internet server remote from the newsworthy event. The user of the system may rely on third-party providers for some of these the communications channels. In some cases, the user subscribes to channels, as with cellular service providers. In other cases, the user may arrange its own frequencies and licenses, as with satellite link 118, microwave link 120, broadband wireless, control link 126 and video downlink 108 connections.

The communications channels terminate at the studio; the broadcast, terrestrial wired, or satellite transmitter site; or at the Internet server site.

Some of the communications channels, 118, 120, and 122, uplink the video imagery processed by the dispatcher 110 and terminate proximate to the studio broadcast transmitter/server 730, where the signals arriving on the communications channels are processed by the gatherer 710 and send through the feed 732 to the broadcast transmitter/server 730. Some users broadcast their programming through a conventional over-the-air television transmitter; others distribute it through an Internet server. The gatherer may be located in the broadcast studio, or it may be located proximate to the broadcast transmitter or Internet server 316

The open systems interconnection (OSI) stack model 330 illustrates how complementary aspects of communications networks work together. At the top of the OSI stack is layer 7, the application layer 302. At the bottom is layer 1, the physical layer 314. The Internet protocol (IP) 1418, one of the defining characteristics of the Internet, resides at layer 3, the network layer 310. The transmission control protocol (TCP), and is alternatives, the user datagram protocol (UDP) and the real-time transport protocol (RTP) 320 reside at layer 4, the transport layer 308. Standards defining the format for video data streams such as H.264, 324-326 and its component network abstraction layer (NAL) 326 reside at layer 6, the presentation 304, and layer 7, the application 302 layers.

In digital communications networks, information flows in the form of bits and bytes in streams over channels, links, and services. The terms channels and links typically refer to lower levels of the OSI stack, while streams and flows are more likely to refer to higher levels from the application layer down to the transport layer.

In one embodiment, this packetizing of camera downlink is accomplished within an industry standards, such as the H.264 of H.265 high definition video standard, by its network abstraction layer (NAL) 326 functionality, but any method for accomplishing the steps depicted are adequate.

The digital signal processor 222 comprises hardware and software that acquire a video signal from camera 402, compress it according to a standard, such as H.264 or H.265 404, depending on the embodiment, chunk it according to the network abstraction layer (NAL) algorithms 406, assign a sequence number to each chunk 414, transmit the chunk to the dispatcher 408, which dispatches it to a wireless channel 410, and records sequence number and channel 412.

The dispatcher 110 comprises an antenna and a transmitter for each uplink channel—118, 120, and 122—an onboard computer, and onboard computer program code—collectively the packetizer 504—that does the digital processing to assign the full motion video stream from the vehicle's camera to a plurality of uplink channels.

The system has a high definition video screen, displayed on the remote control device 124 or the dispatcher 110 or both, on which the user can see the image being downloaded from the AAV and can also see whether the channel is active or not and, if it is active, parameters associated with each uplink channel, including bit rates, congestion, and load balancing measures, such as percentage of total signal sent on that particular channel.

The dispatcher video display 1402 may present imagery captured by an downlink from the onboard camera. Adjacent to its display is a matrix of icons, each column representing an output channel. Only the icons for channel 1 are shown—1406-1422. Channel numbers are displayed by colored icons in the first row of the matrix 1406, 1408, 1410, 1412, 1114—which are green for active channels, red for inactive ones, and yellow for chattels in the process of being throttled because of high error rates. Below each channel icon is a series of other icons indicating the type of channel—cellular, Wi-Fi, microwave, satellite, or proprietary 1416, the bit rate 1418, the latency 1420, and the error rate 1422. The same information is replicated for each channel by icons under its channel number.

The dispatcher comprises hardware and computer program code that distributes the video stream from the camera across a plurality of communication channels for optimal load balancing. It uses predictive algorithms based on non-delivered chunks of data to monitor communication channel capacity and preemptively adjusts video transmission rates to minimize latency. Its computer program code assigns video data chunks to the communication channels using flow control and sequencing algorithms to ensure correct chunk order and data integrity across variable network conditions, records the communications channel to which it assigns each chunk and uses machine learning to predict network conditions and adjust transmission rates for each communication channel based on real-time feedback.

The dispatcher 110 and its associated digitizing and packetizing and modulation protocols use IP, UDP, QUIC, NAL or a similar protocols providing stream ID and offset fields and stream frames to keep the data in order. Any data received out of order is buffered up to a predefined flow control limit. Data received the same stream offset multiple times through different channels of the same channel is discarded.

The dispatcher 110 executes dispatcher algorithms 322, at layer 5, the session layer 306, that assigns video data units to one of a plurality of uplink channels 118-122, after fragmenting them to conform to MTUs of lower level layers: UDP/RTP 320, IP 318, data links 328 and transmitter/Internet server 316.

The dispatcher performs network abstraction layer (NAL) processing on the downloaded image data, fragmenting the image data frames to the MTU of the lower layers in the OSI stack—320-316—1370 bytes, in one embodiment. The dispatcher ensures that the chunk size does not exceed the MTU of any lower layer. Ensuring that the size of the NAL unit passed down to the lower layers does not exceed the MTU of any of those lower layers eliminates the possibility of further fragmentation at lower-layer processing and permits the NAL units to be distributed to the respective communication channels intact.

The dispatcher 110 is a scheduler subsystem that fragments frames received from the camera into chunks and assigns those chunks to separate channels, depending on measured channel performance. Its scheduler function determines the order of packet distribution based on each channel's performance metrics. It seeks optimal load balancing across the channels so that no channel is asked to handle more chunks than its bitrate and latency permit.

The dispatcher processes image data transmitted from the camera. It selects a wireless channel 602, writes a header to the channel with a sequence number for the next chunk of data 604, accepts a byte of data from the video downlink 108, 606, sends the byte to the output channel 608, increments a byte counter by one 610, and tests whether the resulting value of the byte counter is equal to or greater than the maximum transmission unit (MTU) 612. If it is not, the dispatcher repeats the process 616, accepting another byte from the camera downlink 606.

Attaching sequence numbers to each chunk permits the gatherer 710 to reassemble the in proper order even though they arrive at the gatherer 710 at different times, based on different channel performance.

If it is, 618, the dispatcher selects a channel (which may be the same channel or a different one) and repeats the process from step 602.

The dispatcher provides a buffer to contain data downlinked from the camera until it can be processed and buffers to contain data directed to an output channel until the output channel can accept it.

The result of this process is to fragment the much larger units of data represented by an entire video frame from the camera downlink into chunks no greater than can be handled by the MTUs of the lower layers in the OSI stack preparing them for transmission on the output channels.

The sequence numbers in the chunk headers permit the smaller chunks of information to be reassembled in the correct order after they have been fragmented ensuring that the chunks created by this process are no larger in size than the smallest MTU acceptable by lower layers in the OSI stack. Such sizing of the chunks by the dispatcher ensures that no further fragmentation will occur, which might result in loss of sequencing. The dispatcher module distributes the packets among the available channels, which may be as limited as two conventional cellular channels or as numerous as a dozen or more cellular channels, Wi-Fi channels, proprietary video channels, microwave channels, and satellite channels 118, 120, and 122. Until it learns more about channel capacity, the distributor module feeds the packets into each channel sequentially so that the data rate of packets entering each channel is the same.

The flows of NAL units and their corresponding QUIC/UDP segments and IP packets are separated into streams and inserted into communications channels, one stream per channel, but the sequence of NAL units in a particular stream is not a continuous portion of the higher level video sequence. Rather, the NAL units comprising the higher level sequence are distributed across multiple streams and channels according to channel capacity and performance.

The dispatcher 110 software uses UDP (User Datagram Protocol) or optionally QUIC or RTP protocols combined with NAL application-layer flow control and sequencing techniques to manage the video streams. The dispatcher 110 application program code handles packet reordering and flow management, providing greater flexibility for adapting to the variable conditions of cellular networks. The dispatcher 110 paces the sending of packets into each stream based on input from the gatherer 710 to enable the dispatcher 110's role as a congestion controller.

To perform its function effectively, the dispatcher 110 discovers bit rate, latency, and error rate for each channel. Latency discovery is straightforward by means of the Internet ping command. Discovery of bit rate and error rate occurs through the interaction between the dispatcher 110 and the gatherer 710. When the gatherer detects a missing a chunk and therefore sends later chunks to its buffer, as in step 1002, its logic tests whether the buffer is full before trying to write a new chunk to it 1004. If the buffer is not full, the logic writes the chunk to the buffer 1006. If the buffer is full, the logic saves the number for the lowest numbered chunk in the buffer. 1008 This is the first chunk to arrive after the missing one. By decrementing the chunk's number by one 1010, the logic obtains the number of the missing chunk, and sends that number to the dispatcher 1012. The gatherer then flushes the buffer to the transmitter feed 1014.

The dispatcher employs path MTU discovery (PMTUD) techniques for blended networks to detect the smallest MTU along the path dynamically and adjust the size of the packets accordingly. By ensuring that the packet size is smaller than the smallest MTU, fragmentation at the IP layer can be avoided, reducing the risk of sequence numbers being lost or corrupted during fragmentation.

The flow control and sequencing algorithms balance speed and reliability. Flow control continuously adapts to the real-time state of each cellular connection, while sequencing mechanisms ensure that data is delivered in the correct order despite packet loss or out-of-order arrival. The dispatcher uses machine learning and predictive algorithms to monitor network conditions and to adjust flow control and sequencing parameters preemptively to minimize latency and maximize throughput.

One embodiment achieves inter-stream sequencing by defining a protocol that tags data, such as NAL chunks with identifiers specifying which part of a larger message they belong to, regardless of the stream that carries them. The receiver buffers out-of-order chunks and reorders them based on the protocol's rules before further processing. This aspect of the design overcomes a deficiency in the QUIC protocol, which ensures correct intrastream sequencing but not correct interstream sequencing, important for bonded cellular and blended transmission of real time audio and video.

The dispatcher's advanced flow control for blended networks relies on AI (artificial intelligence) algorithms that predict the behavior of each link based on historical data. These algorithms adjust transmission rates, buffer sizes, and sequencing strategies in real-time, optimizing performance based on current network conditions.

Downlink, Gatherer, and Studio Feed

The gatherer 710, located in the studio or at the transmitter site, is responsible for collecting the data streams from the various communication links—118, 120, 122, 518, and 520—and assembling the chunks from those streams in the proper order to replicate the original video downlink 108. It comprises inputs from the satellite link 118, the microwave link 120, and one or more cellular links 122, 518, and 520. Its computer hardware and computer program code (collectively the bundler 804) processes those chunks and feeds the results to the transmitter 432. The gatherer 710 selects a channel 602, reads a chunk 904 from it, and determines whether the sequence number for that chunk is the next one 908. If it is not, it buffers the chunk 606, and selects a channel 602 (which may be the same one or another one), read another chunk 904, and tests its sequence number 908. If the sequence number is the next one the bundler send the chunk to the transmitter feed 910.

The gatherer 710 has an antenna and a receiver for each channel. Its bundler 804 (using NAL logic in one embodiment) receives the streams arriving on those channels and processes them, sending signals back to the dispatcher 110, which may acknowledge packet arrival, indicate missed packets, and buffering frames and packets to reassemble full video frames in the right sequence. Once it has accomplished those tasks, the gatherer 710 passes the series of frames along to the transmitter or server in the form of a reassembled full-motion and high definition video stream, replicating that captured by the camera on the AAV 102.

Interaction of Dispatcher and Gatherer to Effect Flow Control

The dispatcher 110 receives information from the gatherer 710 and computes values for channel congestion, using them to pace packet assignment to particular channels and to disable channels that show persistent congestion.

Flow control mechanisms rely on real-time monitoring of the performance of each link. Feedback loops are employed, allowing the dispatcher to adjust the transmission rate based on the receiver's acknowledgment of successfully received packets or indications of congestion on specific links.

As feedback is received from the gatherer 710 about packet receipt, the dispatcher 110 adapts its algorithm for distributing packets among the channels. It sends more packets to the channels with higher quality and higher capacity and fewer to those with less. The dispatcher 110 also applies a predetermined quality threshold which causes a channel to be disabled altogether when it cannot meet that threshold for a certain predefined interval.

The dispatcher 110 receives the sequence number of a missing chunk from the gatherer, looks up the channel on which that chunk was sent, implements a fault counter for that channel, and tests whether the fault counter is greater than a predetermined threshold. If it is not, the dispatcher awaits the number of another missing chunk. If the fault counter is greater than the threshold, the condition indicates that the channel is failing to deliver chunks. The dispatcher throttles down the channel on which the missing chunk was sent. In this fashion, the dispatcher determines channel capacity dynamically.

The dispatcher throttles channels by assigning weights to each of them. The weights control the relative number of chunks dispatched to the channels relative to the other channels. This effectively throttles the bitrate of data sent by the dispatcher to channels through which sequence numbers of chunks were not received.

To address the potential for packet loss or corruption during fragmentation in a blended network the dispatcher and its computer program code employ error detection and correction techniques to ensure that fragmented data is reassembled correctly and may provide that missing fragments be retransmitted.

To mitigate loss of application-layer-assigned sequence numbers when fragmentation occurs at the transport layer (e.g., QUIC) or network layer (e.g., IP), and sequence numbers are not be preserved as the frames are broken into smaller segments, the dispatcher application program code implement an additional mechanism to retain sequence information through each layer of fragmentation. A header extension can be used, where the application attaches redundant sequence numbers or identifiers to each fragment before the data is handed over to lower layers for fragmentation. Even if the application frame is split, the fragments will carry part of this sequencing information, ensuring that the receiver can reorder and reassemble the original data frame after all fragments have arrived.

The system may employ QUIC stream offsets in each frame to maintain the order of the data, even after fragmentation. These offsets allow QUIC to reassemble the original application-level data once all fragments have been received. By employing flow control mechanisms, QUIC ensures that the receiving side can acknowledge the successful receipt of each fragment, allowing the sender to retransmit any missing parts. If fragmentation at the QUIC layer causes the loss of application-level sequence numbers, the QUIC stream offset serves as a backup, ensuring proper reassembly and ordered delivery.

The gatherer 710 can employ out-of-order buffering and selective acknowledgment mechanisms to handle fragmented data. When fragments arrive out of order, the gatherer buffers them temporarily until all fragments have arrived. Sequence numbers or offsets at the transport layer (e.g., QUIC) ensure that the data is reassembled correctly once all fragments are received. If any fragments are missing, the gatherer can request retransmission of the missing parts.

The effect of a missing chunk is largely concealed by the error recovery algorithms built in to standards, such as H.264 and H.265. The system also maintaining quality of the stream by adapting to the disparate capabilities of the channels. Thus, in addition to the error concealment capabilities built into the standard, the system and method provide for feedback about channel losses.

Increasingly, news is distributed through the Internet rather than through over-the-air broadcasts. When Internet distribution occurs, one or more servers play the same role as the television transmitter for over-the-air broadcasts. The video flow is the same, and thus the design and function of the gatherer 710 is the same, regardless of the means of ultimate distribution to viewers.

Electrical Power Management

The system mitigates the constraints resulting from limited autonomous aerial vehicle 102 endurance by detecting battery exhaustion, and using an apparatus that removes a depleted battery and inserts a fully charged battery. This battery replacement station 1204, receives a autonomous aerial vehicle, removes its battery, replaces the battery with a fully charged battery suitable for the autonomous aerial vehicle, and accepts the exhausted battery and charges it.

The battery replacement station 1204 comprises a source of electrical power, components that charge batteries, a moveable rack for accepting the exhausted battery, and components that charge the depleted battery.

Once the autonomous aerial vehicle 102 has received a fully charged battery, the power manager 1202 relaunches it and commands it to return to the position proximate to the newsworthy event and to resume its video capture.

The autonomous aerial vehicle monitors its electrical charge remaining and signals the power manager when the remaining charge is less than a pre-determined level—15% in one embodiment. Upon receiving such a signal, the power manager commands the vehicle to go to a battery replacement station, which automatically extracts the nearly depleted battery and replaces it with a fully charged one. The power manager commands one of the other vehicles to take up the station vacated by the vehicle having its battery replaces and reassigns the returning fully-charged vehicle to another station.

When a autonomous aerial vehicle—1404 detects a low battery level, 15% in one embodiment, it sends a message to the power manager 1202 in the form: TB, replacement (request). After a autonomous aerial vehicle goes to the battery replacement station 820 and receives a fully charged battery, it sends a message to the power manager 1202 in the form: TB, replacement(received), whereupon the power manager 1202 issues an appropriate assign command to the vehicle.

Figure 12:
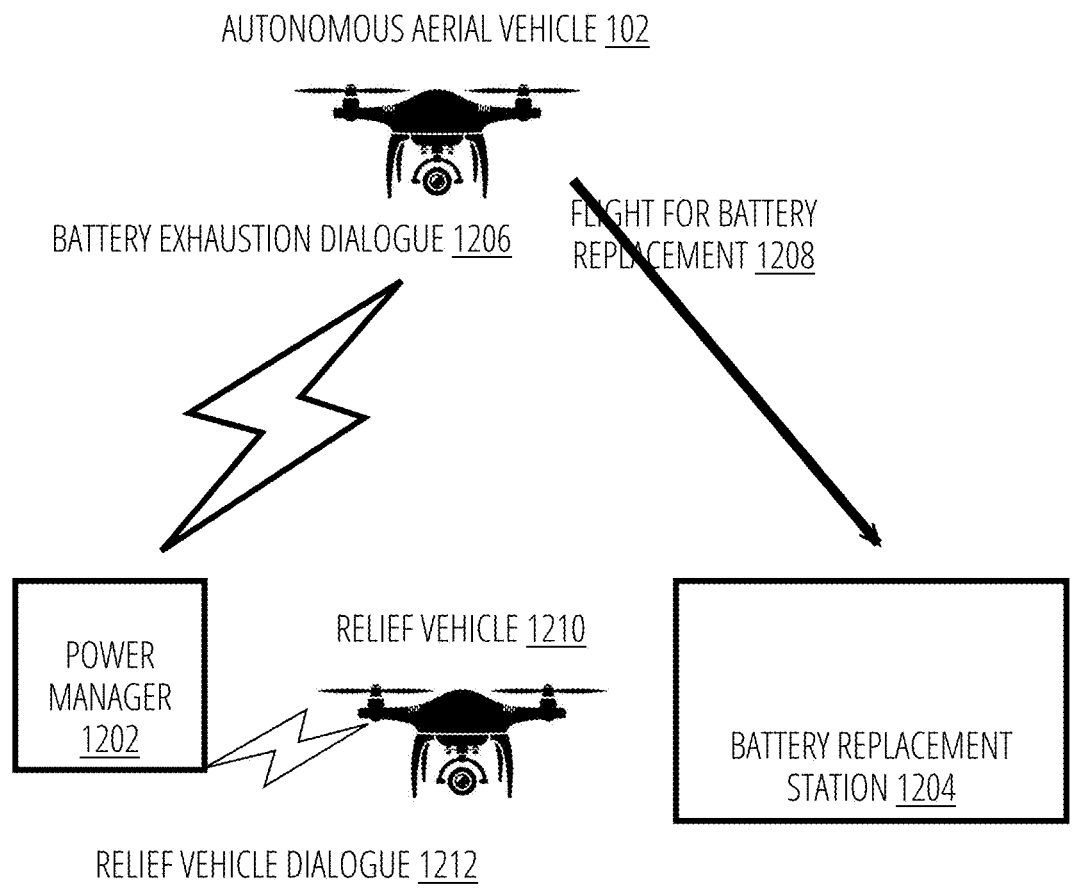
FIG. 12 shows the interaction of the autonomous aerial vehicle, the battery replacement station and the power manager
Figure 13:
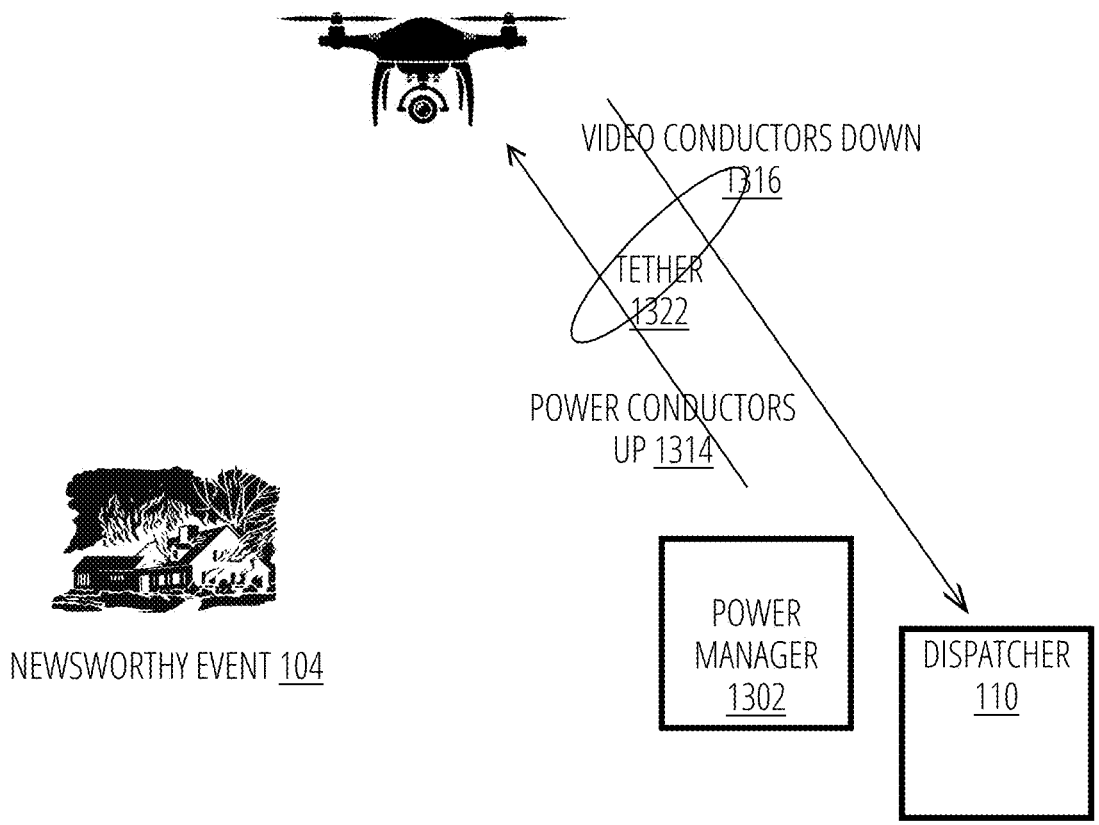
FIG. 13 depicts an embodiment that provides electrical power to the autonomous aerial vehicle continuously through a tether and that sends camera video down to the dispatcher through the same tether.
Figure 14:
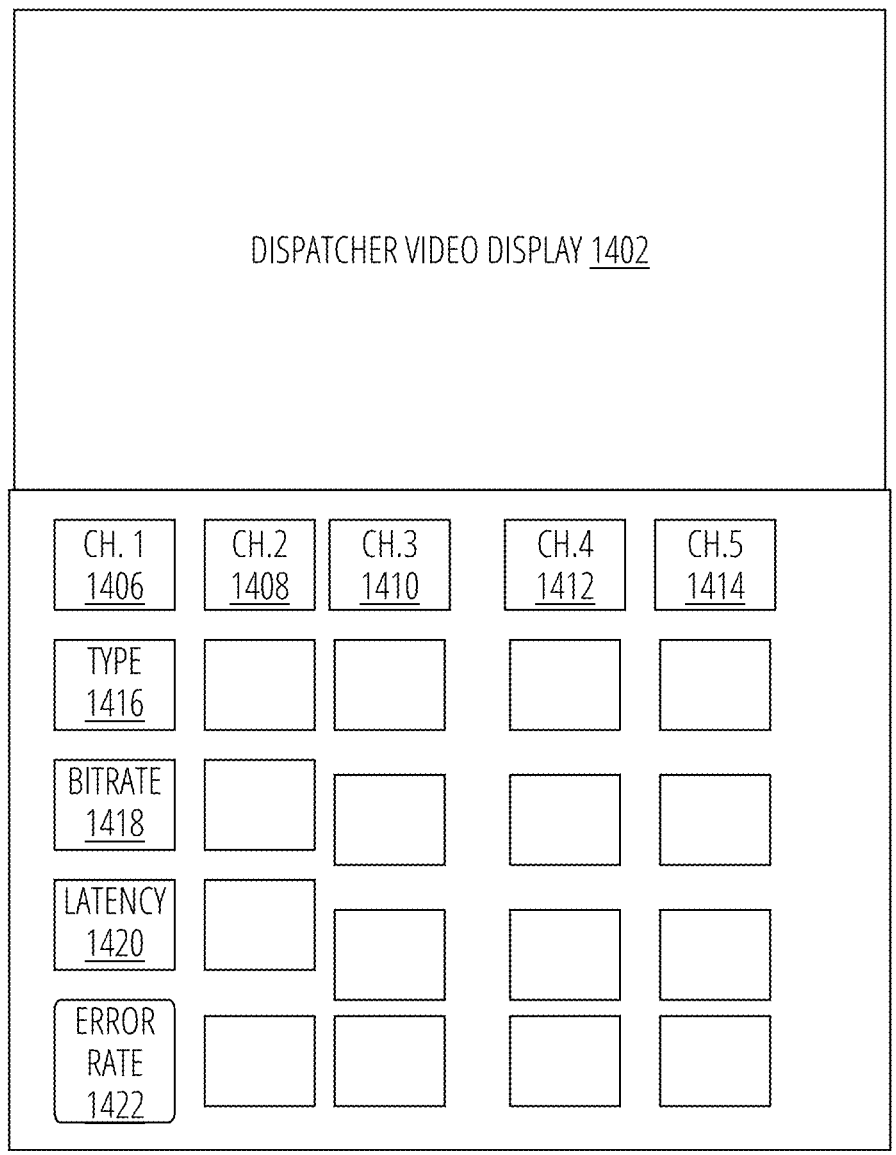
FIG. 14 depicts the user interface of the dispatcher.
Figure 15:
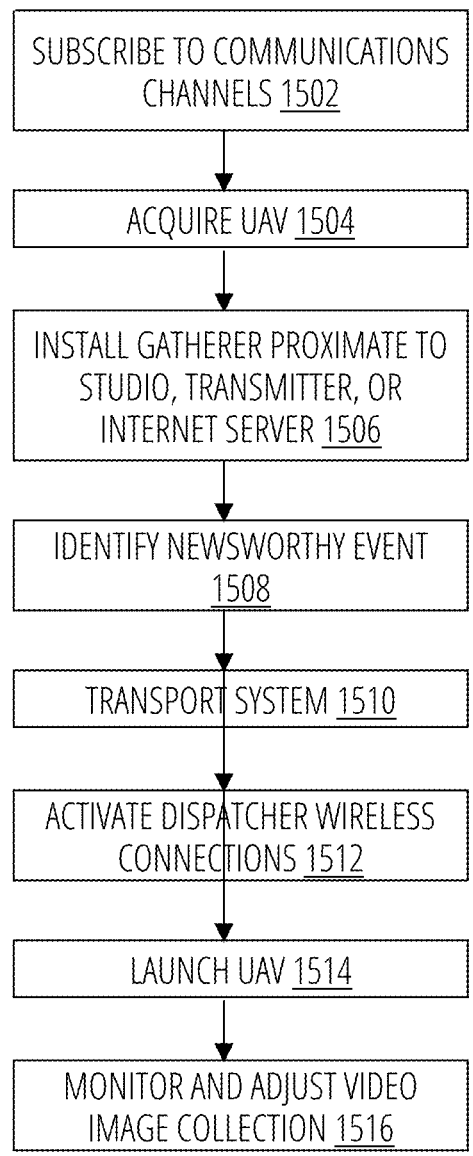
FIG. 15 is a flowchart depicting a method for using the system.

FIG. 12 depicts the battery-replacement process. When a vehicle detects that its battery level has reached a pre-determined threshold—below 15% in one embodiment, it sends a message to the power manager 1202. The message causes the power manager to command the vehicle to leave formation and go to battery replacement station 1204. The battery replacement station 1204 extracts the low battery and connects to charging apparatus and installs fully charged battery.

In one embodiment, a second autonomous aerial vehicle called the relief vehicle 1210 is provided. As soon as the first autonomous aerial vehicle 102 sends a battery exhaustion message 906 to the power manager 1202, the power manager 1202 transmits a message 1212 to the relief vehicle 1210, launching it and causing it to take up the position now vacated by the first vehicle. Availability of a relief vehicle 1210 means that coverage of the newsworthy event is continuous, even while autonomous aerial vehicles are obtaining battery replacements.

The battery replacement station 1204 is a commercially available off-the-shelf automatic-landing-zone, battery-charger and battery-replacement system capable of directing a vehicle to dock in the proper place on the automatic landing zone, after which it removes the nearly depleted battery and places it on the charging apparatus. The apparatus inserts a fully charged battery into the vehicle. After the charging station completes those operations, it signals the power manager 1202, and the power manager gives a signal to the vehicle, which now has a fully charged battery, authorizing it to return to its position for monitoring the newsworthy event 104. Upon receiving that signal from the power manager, the vehicle returns to a position proximate to the newsworthy event.

The source of electrical power is adequate to handle the total number of batteries. One embodiment provides three square feet of solar panel area.

The charging station is powered by solar panels of appropriate size, three square feet in area in one embodiment. An auxiliary gasoline or diesel engine backs up the solar power in one embodiment. Fixed batteries in the charging station serve as a buffer and storage medium between the electrical source and the vehicle-battery charging apparatus.

In an alternative embodiment, the autonomous aerial vehicle 102 can remain aloft, covering the newsworthy event 104, as long as the event persists. In this embodiment, the autonomous aerial vehicle does not have to land to receive a charged battery. It receives a continuous supply of electricity through a power conductor up to the vehicle 1314, contained in a tether 1322 from the power manager 1202. The tether 1322 also carries telemetry from the vehicle to the remote control device and the dispatcher and commands from the remote control device and the dispatcher to the vehicle on a digital communications conductor. Video conductors down 1316 in same tether 1322. carry camera video signals down to the dispatcher 110.

Optionally the tether also can carry commands up to the autonomous aerial vehicle from the remote control device and telemetry from the autonomous aerial vehicle back to the remote control device.

Method of Use

One method for broadcasting high definition video imagery from the system comprises: subscribing to a plurality of communications channels 1502 including cellular, Wi-Fi, microwave, satellite, and proprietary services and acquiring a AAV 1504, equipped with a high definition video camera and a 3600 three axis gimbal and a remote control device. Then one acquires a dispatcher module, which contains software and hardware that take the video stream from the onboard camera, packetize it, and divide it into separate streams, sending each of them to one of the subscribed wireless channels.

One installs a gatherer proximate to a studio, transmitter, or Internet server 1506, also proximate to the terminations of the communications channels, where the gatherer will receive signals from the plurality of wireless channels and combine them into a single stream representative of the video captured by the autonomous aerial vehicle's camera.

At this point, the system is ready to collect news.

The next steps are to identify a newsworthy event 1508 according to the judgment of the supervising journalists and editors using the system; to transport the system 1510, comprising the autonomous aerial vehicle, the remote control device, and the dispatcher module to a location proximate to the newsworthy event; to activate dispatcher wireless connections 1512 with all of a plurality of subscribed communication services; and to launch the AAV 1514 and fly it to a position where it has a view of the newsworthy event.

Operation of the system involves an interplay between commands given by the system user, typically a journalist, and autonomous action by the AAV. Once the human user has positioned the AAV proximate to the newsworthy event, he launches it manually and directs it toward the newsworthy event. Thereafter, the AAV can operate autonomously, as determined by the user, keeping the newsworthy event within the frame of its camera, maintaining AAV orientation, altitude, and horizontal position, flying predefined maneuvers with respect to the newsworthy event, or responding to specific commands by the user.

Thereafter, the reporter-user monitors and adjust video image collection 1516 through the remote control device 124 and the dispatcher 110 as the system collects video imagery and transmits it through the dispatcher module, the plurality of communications links, and the gatherer to a broadcast transmitter or Internet server. As he thinks appropriate, or as he is directed by his producer, the reporter-user may provide commands through the remote control device to reposition the vehicle or to adjust the camera for the best imagery.

The goal of the system and method is to facilitate newsgathering. Manipulation of the AAV camera, therefore, is a central part of use of the system. A skilled human photojournalist controls the camera and makes effective use of its built-in automatic features to capture compelling imagery of a variety of news scenes. He does this by monitoring the video imagery captured by the AAV's camera in real time and repositioning the AAV and altering its camera field-of-view, contrast, brightness, and focal points. Because the position of the camera is easily adjustable by changing the position of the AAV, camera controls are conveniently co-located with vehicle controls on remote control devices.

I claim:

1. A system for capturing and broadcasting real-time video of newsworthy events and background imagery for news, comprising:
   an autonomous aerial vehicle (AAV), comprising:
   at least one digital video camera;
   a three-axis 360° gimbal attached to each camera;
   a digital signal processor capable of compressing and chunking a bit stream representing video imagery captured by the camera;
   a remote control device, comprising:
   a video display;
   a plurality of controls allowing a human user to command autonomous aerial vehicle maneuvers and flight paths capable of launching the autonomous aerial vehicle and flying it to a position where it has a view of the newsworthy event
   a plurality of sensors and computer program code that enable the AAV to carry out human-user commands autonomously and to maintain altitude, horizontal position, and to perform maneuvers with respect to the newsworthy event, as commanded by the human user;
   a plurality of displays and controls capable of monitoring the autonomous aerial vehicle and a dispatcher module as they collect video imagery and transmit it through the dispatcher module, the plurality of communications channels, and a gatherer to a broadcast transmitter or Internet server through a broadcast studio;
   a plurality of controls for commanding each camera's angle and field of view;
   a radio transceiver on the autonomous aerial vehicle capable of transmitting telemetry to the remote control device and receiving commands from the remote control device;
   a radio downlink transmitter mounted on the autonomous aerial vehicle capable of transmitting high-definition video of at least H.264;
   a plurality of wireless links from the autonomous aerial vehicle to the dispatcher and the remote control device, the dispatcher configured to:
   chunk a video stream downlinked from the cameras, by dividing said stream into smaller clusters of bytes, ensuring that the size of each such cluster does not exceed the maximum transmission unit ("MTU") of any lower layer on the open systems interconnection ("OSI") stack representing the elements of a digital communication network;
   attach a sequence number to each chunk; and
   send such chunks through a plurality of wireless channels comprising one or more cellular connections; one or more satellite connections; one or more microwave connections; and one or more broadband wireless connections;
   feed said chunks into said channels according to the measured performance of each channel;
   keep track of the chunks that it has sent by chunk number and the channel on which each chunk was sent;
   throttle wireless uplink channels failing to deliver chunks by reducing the bitrate of their bitstreams;
   a plurality of wireless channels connecting the dispatcher with the gatherer, which gatherer is configured to:
   reassemble chunks into full stream imagery for over-the-air broadcasting, terrestrial-wired broadcasting, satellite broadcasting or distribution through the Internet;
   keep track of chunks not received by sequence number;
   periodically send the sequence numbers of chunks not received to the dispatcher.

2. The system of claim 1, wherein the autonomous aerial vehicle comprises:
   four rotors powered by brushless direct current (DC) motors;
   sensors, comprising at least one camera, one lidar sensor, a barometric altimeter, an internal measurement unit (IMU), and a GPS (global positioning system) receiver;
   a guidance-and-control module operable:
   to process sensor data to determine the vehicle's latitude, longitude, and altitude, and to update said data periodically; and also
   to receive commands from the remote control device and execute flight paths based on said commands;
   wherein the GPS receiver is combined with the IMU to provide real-time updates of the autonomous aerial vehicle's location and altitude, with data refreshed several times per second.

3. The system of claim 1, wherein the digital signal processor comprises hardware and software configured to:
   compress a bitstream from the camera according to the H.264 standard; and
   chunk the bitstream according to the H.264 standard, by segmenting it into smaller clusters of information.

4. The system of claim 1, wherein the digital signal processor comprises hardware and software configured to:
   compress a bitstream from the camera according to the H.265 standard; and
   chunk the bitstream according to the H.265 standard, by segmenting it into smaller clusters of information.

5. The system of claim 1, wherein the guidance-and-control module comprises:
   a sensor module with a combination of at least one camera, lidar sensor, barometric altimeter, IMU, and GPS receiver;
   an onboard processor configured to execute algorithms modeling vehicle dynamics, determine vehicle position and orientation, and process sensor data;
   a remote control interface for accepting user input, and translating high-level maneuver commands into yaw, pitch, roll, and thrust commands for the autonomous aerial vehicle's (AAV's) motors;
   computer program code that generates specific rotor RPM (revolutions per minute) and pitch adjustments speed, steering, and rotor pitch adjustments to position the AAV on a flight path based on the AAV's current flight path, environmental conditions, and program commands.

6. The system of claim 1, wherein the dispatcher comprises:

hardware and computer program code that distributes the video stream from an autonomous aerial vehicle across a plurality of communication channels for optimal load balancing;

predictive algorithms to monitor communication channel capacity and preemptively adjust video transmission rates to minimize latency;

computer program code that:

assigns video data chunks to the communication channels using flow control and sequencing algorithms to ensure correct chunk order and data integrity across variable network conditions;

records the communications channel to which it assigns each chunk;

machine learning to predict network conditions and adjust transmission rates for each communication channel based on real-time feedback.

7. The system of claim 1, also comprising a power management system comprising:

an onboard battery monitoring system that monitors the autonomous aerial vehicle battery levels, signals a power manager when the battery level reaches a predetermined threshold, and directs the autonomous aerial vehicle to a battery replacement station;

a battery replacement system, comprising:

an automatic landing zone;

an apparatus that:

removes a depleted battery;

inserts a fully charged battery into the autonomous aerial vehicle; and charges the exhausted battery;

a source of electrical power;

components that charge batteries; and solar panels and auxiliary power sources for recharging depleted batteries.

8. The system of claim 1, also comprising an electrical power tether comprising:

a tether connecting the autonomous aerial vehicle with a power manager;

the tether comprising:

a power conductor;

a digital communications conductor, capable of carrying telemetry and command information.

9. A method for broadcasting high definition video imagery from an autonomous aerial vehicle, comprising:

arranging a plurality of subscribed communications channels comprising cellular, 802.11x-compliant (Wi-Fi), microwave, satellite, and proprietary services;

installing a gatherer at the transmitter site or studio proximate to the terminations of the communications channels;

acquiring an autonomous aerial vehicle equipped with a high definition video camera and a 360° three axis gimbal;

acquiring a remote control device for the autonomous aerial vehicle;

acquiring a dispatcher module;

identifying, by a human operator, a newsworthy event;

transporting the autonomous aerial vehicle, the remote control device, and the dispatcher module to a location proximate to the newsworthy event;

activating the dispatcher's connections with all of a plurality of subscribed communication services;

launching, by a human user, of the autonomous aerial vehicle and commanding it to fly to a position where it has a view of the newsworthy event;

carrying out human commands to the AAV autonomously, through onboard sensors and a navigation and control module;

chunking a video stream downlinked from the camera, by dividing said stream into smaller clusters of bytes, ensuring that the size of each such cluster does not exceed the maximum transmission unit ("MTU") of any layer of a digital communication network;

monitoring the autonomous aerial vehicle and the dispatcher as they collect video imagery and transmit it through the dispatcher module, the plurality of communications channels, and the gatherer to a broadcast transmitter or Internet server through a broadcast studio; and throttling communications channels by reducing the bitstream according to each subscribed communications channel's capacity.

10. The method of claim 9, wherein throttling the subscribed communications channels comprises:

assigning sequence numbers to chunks of information sent by a dispatcher module over a plurality of wireless links to the gatherer;

recording by the gatherer of the sequence numbers not received;

sending those sequence numbers to the dispatcher; and throttling the bitstream by reducing the bitrate of data sent by the dispatcher to channels through which sequence numbers of chunks were not received.

11. The method of claim 9, also comprising:

detecting battery exhaustion in the autonomous aerial vehicle;

flying the autonomous aerial vehicle from its position proximate to the newsworthy event to a battery replacement station;

obtaining a fully charged battery at the battery replacement station;

installing the fully charged battery in the autonomous aerial vehicle;

relaunching the aerial vehicle autonomous aerial vehicle;

returning it to the position proximate to the newsworthy event; and resuming video capture.

12. The method of claim 9, also comprising:

equipping the autonomous aerial vehicle with a tether, comprising:

power conductors up; and digital communications conductors up; and video conductors down.

* * * * *